United States Patent
Corneliussen

(10) Patent No.: US 6,601,099 B1
(45) Date of Patent: Jul. 29, 2003

(54) METHOD FOR EXTENDING THE USE OF SIP (SESSION INITIATION PROTOCOL)

(75) Inventor: Knut Snorre Bach Corneliussen, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/450,270

(22) Filed: Nov. 26, 1999

(30) Foreign Application Priority Data

Nov. 27, 1998 (NO) .......................................... 19985567

(51) Int. Cl.$^7$ ............................................ G06F 15/173
(52) U.S. Cl. ........................ 709/224; 709/204; 709/227
(58) Field of Search ................................ 709/204, 231, 709/224, 227; 370/355

(56) References Cited

U.S. PATENT DOCUMENTS 6,178,439 B1 * 1/2001 Feit ............................. 709/224
6,430,176 B1 * 8/2002 Christie, IV ................. 370/355

OTHER PUBLICATIONS

Handley et al. "Internet–draft: SIP: Session Initiation Protocol", Internet Engineering Task Force, 1998, pp. 1–118.*
Schulzrinne et al. RFC 1889, Internet Engineering Task Force, 1996, pp. 1–75.*
M. Handley et al., "SIP: Session Initiation Protocol", Network Working Group Request for Comments: 2543, Mar. 1999. pp. 1–153.
ITU–T—Telecommunication Standarization Sector of ITU—Q.931; "Digital Subscriber Signalling System No. 1 (DSS 1)—ISDN User–Network Interface Layer 3 Specification for Basic Call Control"; Series Q: Switching and Signalling Digital Subscriber Signalling System No. 1—Network Layer; May 1998. pp. 1–388.
ITU–T—Telecommunication Standarization Sector of ITU—H.323; "Packet–Based Multimedia Communications Systems"; Series H: Audiovisual and Multimedia Systems Infrastructure of audiovisual services—Systems and terminal equipment for audiovisual services; Feb. 1998. pp. 1–114.

* cited by examiner

Primary Examiner—Zarni Maung
Assistant Examiner—Gregory Clinton

(57) ABSTRACT

A method of extending the use of SIP (Session Initiation Protocol) in a communication system wherein H.323 or SIP-compliant end-points communicate with the media traffic directly between other H.323 or SIP-compliant end-points. An extension of the SIP protocol is utilized to provide better support for charging. A plurality of equivalent INVITE messages are sent to the SIP server at regular time intervals for the duration of the session. Charging for SIP conversations can be determined in a very accurate and expedient manner by observing when the INVITE messages cease, indicating that the conversation between the two end-points is concluded.

9 Claims, 2 Drawing Sheets

This figure shows how the SIP protocol can be extended to support a "continue call" function. Note that for simplicity only the INVITE messages from the calling end-point is shown.

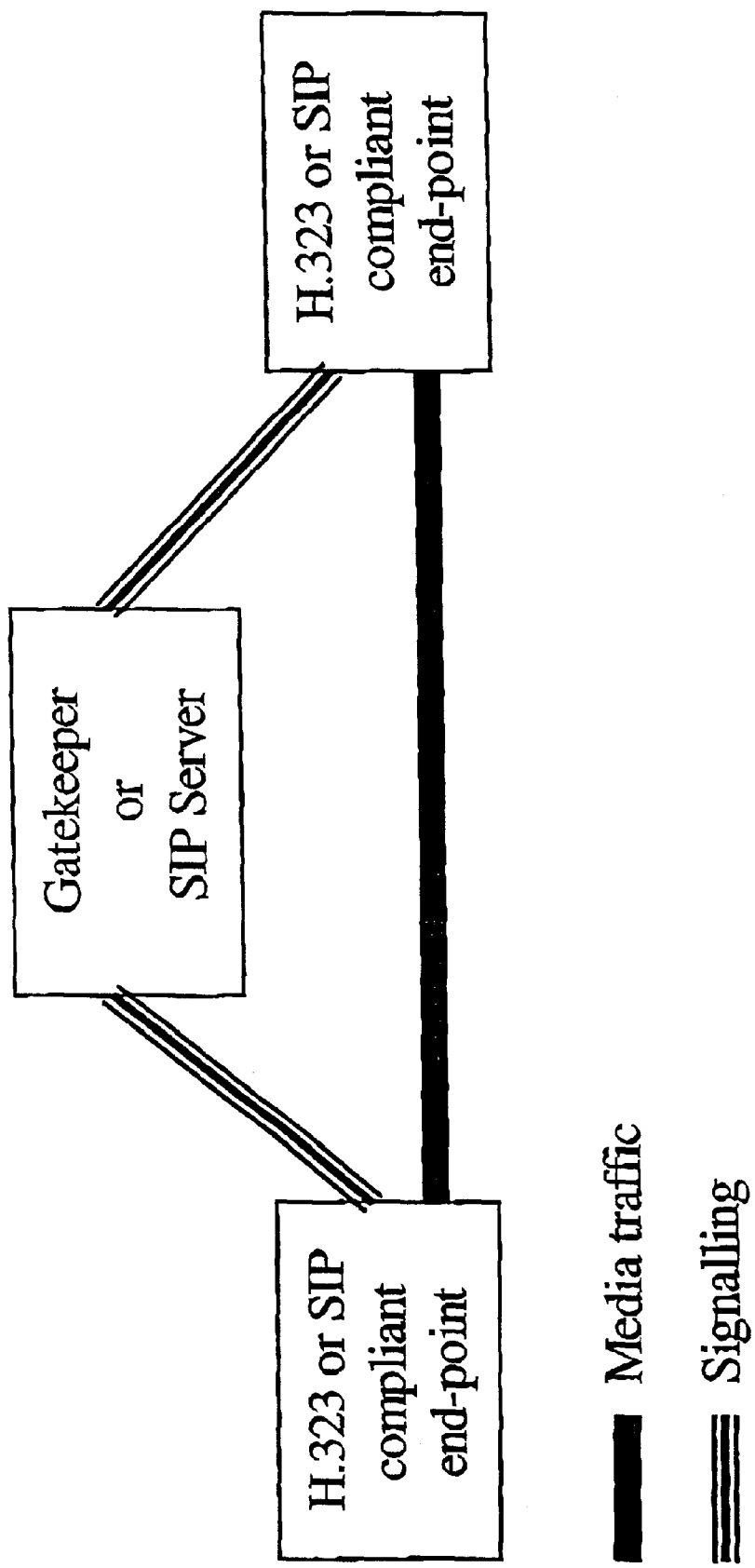
Figure 1 This figure shows how the signalling is sent to either a gatekeeper or a SIP server. The media traffic is sent directly between the H.323 or SIP compliant end-points.

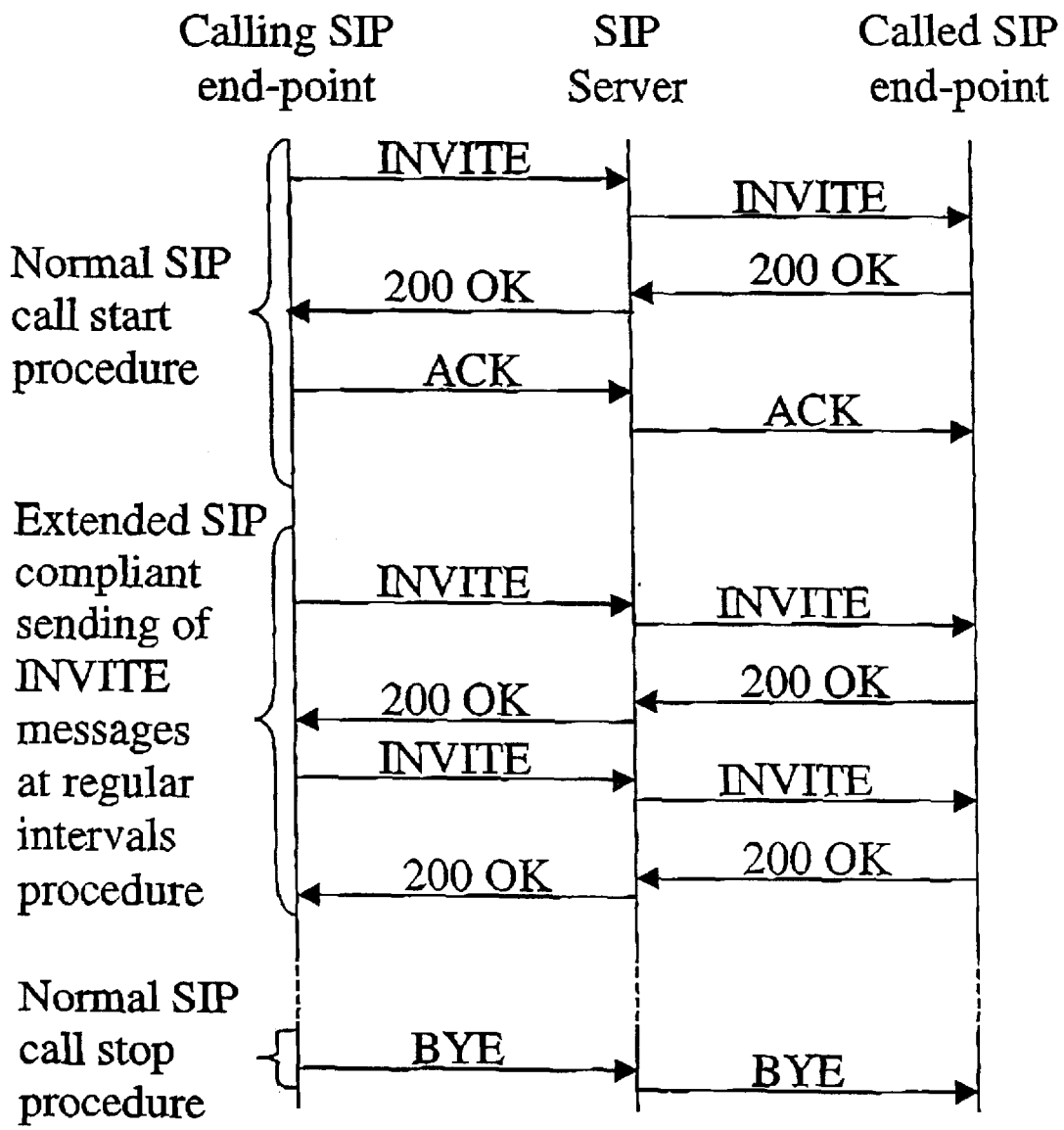
Figure 2 This figure shows how the SIP protocol can be extended to support a "continue call" function. Note that for simplicity only the INVITE messages from the calling end-point is shown.

METHOD FOR EXTENDING THE USE OF SIP (SESSION INITIATION PROTOCOL)

This application claims priority under 35 U.S.C. §§119 and/or 365 to 19985567 filed in Norway on Nov. 27, 1998; the entire content of which is hereby incorporated by reference.

FIELD OF THE INVENTION

The present invention relates to telecommunications. More particularly, and not by way of limitation, the present invention is directed to a method for extending the use of SIP (Session Initiation Protocol).

More specifically the present invention relates to such a method for facilitating the charging of such SIP connections.

TECHNICAL BACKGROUND

The Problem

SIP, as described in Handley et. al., "SIP: Session Initiation Protocol", is a competitive protocol to H.323, which is described in ITU-T, "document packet-based multimedia communications systems", to allow Multimedia applications to operate over the IP protocol. The Internet Engineering Task Force (IETF) has standardized SIP. The latest version of SIP is currently only a draft, provided by the Multi-party Multimedia Session Control (MMUSIC) working group (WG) in IETF.

The SIP protocol supports most of the features of the H.323 protocol, but it is simpler in respect to a number of different messages. The fact that SIP is simpler than H.323 makes it easier to make a SIP-compliant end-point than an H.323-compliant end-point. New development tools and programming languages also make it easier to control media-interferences. This also makes it easier to make a multi-media end-point. When making an end-point, it is also easy to add additional logic and functionality beyond what is stated in the standard.

One of the methods for performing charging for SIP or H.323 conversations is to place the charging logic inside a SIP server or a gatekeeper (H.323), as illustrated in FIG. 1.

One of the problems with SIP is that it does not have support for a typical "continue call" message. Another problem is that SIP-complaint end-points could send the CLOSE message directly to each other instead of via a SIP server. This makes it difficult to support charging for SIP conversations. The reason for this is that the media traffic is not sent via the gatekeeper or the SIP server, and it is difficult to know when the conversation is closed.

Known Solutions

In the H.323 standard there is support for a "continue call" message. In the Q.931 signaling protocol part of H.323, which is described in the ITU-T standard, the message is called "status inquiry" In the RAS part of H.323 the IPR message can be used for the same purpose. In H.323 it is also required that the end-points send the "closed conversation" message via the gatekeeper (if a gatekeeper-routed call model is used).

OBJECTS OF THE INVENTION

An object of he present invention is to provide a method by which the use of SIP (Session Initiation Protocol) is extended in a rational and expedient manner.

A further object of the present invention is to provide a method by which it is radially observed when a conversation between two end-points is concluded.

A still further object of the present invention is to provide a method by which charging for SIP conversations can be stipulated in a very accurate and expedient manner.

A still further object of the present invention is to provide a method by which the message "continue call" is favourably supported by a corresponding SIP server.

BRIEF DISCLOSURE OF THE INVENTION

These objects are achieved in a method as stated in the preamble, which is characterised by the features as stated in the characterising clause of the enclosed patent claim 1.

In other words, the present invention can be defined as an extension of the SIP protocol, the main idea of the present invention being that the missing "continue call" message is solved by sending extra INVITE messages to the SIP server.

Further features and advantages of the present invention will be apparent from the following description taken in conjunction with the enclosed drawings, as well as from the further appended patent claims.

BRIEF DISCLOSURE OF THE DRAWINGS

FIG. 1 is a block diagram illustrating how the signalling is sent to either a gatekeeper or an SIP server, the media traffic being sent directly between the H.323 or SIP compliant end-points.

FIG. 2 is a schematic diagram illustrating how the SIP protocol can be extended to support a "continue call" function, it being noted that for simplicity only the INVITE messages from the calling end-point are shown.

DETAILED DESCRIPTION OF EMBODIMENTS

As previously explained, FIG. 1 illustrates one of the methods for performing charging for SIP or H.323 conversations by placing the charging logic inside an SIP server or gatekeeper (H.323). This Figure shows how the signalling is sent either to a gatekeeper or a SIP server. The media traffic is sent directly between the H.323 or SIP compliant end-points.

In the SIP protocol the start of conversation message is called INVITE. This message is sent to the SIP server when a SIP compliant end-point wants to initiate a conversation with another end-point, or start a conference with several end-points. The INVITE message contains information about what type of media it supports, and together with the ACK message this information is used as the method for negotiation of media streams. When an end-point wants to add or remove media streams the INVITE message is also used. When the INVITE message is used to define the set of current media streams, the CALL-ID in the INVITE message must be the same as the first INVITE message.

The present invention is to be regarded as an extension of the SIP protocol. The main idea behind the present invention is that the missing "continue call" message is solved by sending extra INVITE messages to the SIP server.

In FIG. 2 it is illustrated how the SIP protocol can be extended to support a "continue call" function. It should be noted that for the sake of simplicity only the INVITE messages from the calling end-point are shown.

In one embodiment of the present invention, the extra INVITE messages are sent at regular intervals. These INVITE messages should be equal to the last INVOKE message that was sent according to the SIP protocol. This means that the CALL-ID and the media channel described in the INVITE message must be the same. The Cseq (command sequence) field should also be the same in the extra INVITE messages as in the original INVITE message.

If the SIP server doesn't receive an INVITE message during the predefined interval, it considers the SIP conversation between the end-points as closed. To inform the other end-point(s), the SIP server should send a BYE message to it. To increase robustness the SIP server should also send the BYE message to the end-point that has stopped sending INVITE messages.

The reason for a stop in the sending of the INVITE message could be that the end-point has sent a BYE message directly to the other end-point, or it could be that the end-point has crashed, the physical link is broken, etc.

This solution requires some extension to the original SIP protocol. This should not be a problem because it is quite easy to make SIP end-points. If, however, normal SIP end-points must be used, the solution is to add a special SIP proxy. The requirement for this proxy is that it has some knowledge about the physical layer of the normal SIP end-point. This special SIP proxy will act as a normal SIP proxy as described in the SIP standard, but it will send new INVITE messages at regular intervals to the SIP Server during the conversation. Because this SIP proxy has some knowledge about the physical layer of the normal end-point, it should stop sending new INVITE messages when it discovers that the end-point stops sending media streams.

Advantages

By using the idea described in the section above a robust charging mechanism can be implemented for SIP. This charging mechanism can base its charge not only on a fixed price per conversation, but also on a time component since it knows the duration of the conversation. This charging mechanism can also base it charge on a volume component since the type of media used is described in the INVITE message. Charging for volume can also be done in a normal SIP implementation.

Another advantage of the idea with extra INVITE messages is that an end-point that uses this method is still totally compliant to normal SIP end-points. The normal SIP end-point will only consider the extra INVITE message as a re-transmission of an old one. This is because it has the same CALL-ID, CSeq and media description. It is also said in the standard that the end-points should consider INVITE message with the same CSeq as retransmission, and it should be dropped.

Broadending

Another message than INVITE could be used for implementing the "continue call" function in SIP, i.e. a new message type could be used. If a new signal is used, it should operate in the same way as the extra INVITE described in the sections above. If a new message type is used it is not guarantied that it will inter operate with normal SIP end-points.

REFERENCES

[1] Handley/Schulzrinne/Schooler/Roserberg "SIP: Session Initiation Protocol" Internet Draft, Internet Engineering Task Force, ietf-mmusic-sip09.txt, Sep. 18, 1998
[2] ITU-T Recommendation H.323 (1998), "Packet-based multimedia communication systems".
[3] ITU-T Recommendation Q.931 (1993), "ISDN user-network interface layer 3 specification for basic call control"

What is claimed is:

1. A method of extending the use of SIP (Session Initiation Protocol) in a communication system wherein SIP-compliant end-points communicate via a media stream directly with other SIP-compliant end-points, said method comprising the steps of:

sending an original SIP INVITE message from an originating end-point to a gatekeeper or a SIP server, to initiate a SIP session;

sending a plurality of equivalent INVITE messages to said gatekeeper or said SIP server at regular intervals throughout the session;

detecting by the gatekeeper or SIP server that the equivalent INVITE messages are no longer being sent;

determining by the gatekeeper or SIP server that the session has ended when a predetermined time period elapses without receiving an equivalent INVITE message; and sending a BYE message from the gatekeeper or SIP server to the end-point that stopped sending equivalent INVITE messages when the predetermined time period elapses without receiving an equivalent INVITE message.

2. The method of claim 1, wherein the step of sending a plurality of equivalent INVITE messages includes sending a plurality of INVITE messages in which a CALL-ID and a media channel are identical to a CALL-ID and a media channel in the original SIP INVITE message.

3. The method of claim 2, wherein the step of sending a plurality of equivalent INVITE messages includes sending a plurality of INVITE messages in which a CSeq (Command Sequence) is identical to a CSeq in the original SIP INVITE message.

4. A method of extending the use of SIP (Session Initiation Protocol) in a communication system wherein SIP-compliant end-points communicate via a media stream directly with other SIP-compliant end-points, said method comprising the steps of:

sending an original SIP INVITE message from an originating end-point to a gatekeeper or a SIP server, to initiate a SIP session;

sending a plurality of equivalent INVITE messages to said gatekeeper or said SIP server at regular intervals throughout the session;

detecting by the gatekeeper or SIP server that the equivalent INVITE messages are no longer being sent;

determining by the gatekeeper or SIP server that the session has ended when a predetermined time period elapses without receiving an equivalent INVITE message; and determining by the gatekeeper or SIP server, a reason why the equivalent INVITE messages are no longer being sent.

5. The method of claim 4, wherein the step of determining a reason why the equivalent INVITE messages are no longer being sent includes determining by the gatekeeper or SIP server, whether an end-point has sent a BYE message directly to the other end-point, whether the end-point sending the equivalent INVITE messages has crashed, or whether a physical link has broken down, in response to detecting by the gatekeeper or SIP server that the equivalent INVITE messages are no longer being sent.

6. The method of claim 4, wherein the SIP-compliant end-point sending the equivalent INVITE messages is associated with a special SIP proxy, and the step of sending a plurality of equivalent INVITE messages to the gatekeeper or SIP server includes sending the plurality of equivalent INVITE messages at regular intervals from the special SIP proxy to the gatekeeper or SIP server during the session.

7. The method of claim 6, wherein the special SIP proxy monitors the media stream between the SIP-compliant end-points, and the method includes stopping the sending of equivalent INVITE messages when the SIP proxy detects that the media stream between the end-points has stopped.

8. The method of claim 1, wherein a media type is identified in the original SIP INVITE message, and the method further comprises the steps of:

provisioning a charging mechanism for determining a charge for the session;

determining a duration of the session;

determining a charge for the session based alternatively on a fixed price per session, on the duration of the session, or on a volume calculation based on the media type identified in the original SIP INVITE message, and the duration of the session.

9. A method of extending the use of SIP (Session Initiation Protocol) in a communication system wherein SIP-compliant end-points communicate via a media stream directly with other SIP-compliant end-points, said method comprising the steps of:

sending a SIP INVITE message from an originating end-point to a gatekeeper Or a SIP server, to initiate a SIP session, said SIP INVITE message including a CALL-ID and a media channel;

sending a plurality of CONTINUE CALL messages to said gatekeeper or said SIP server at regular intervals throughout the session, said CONTINUE CALL messages including a CALL-ID and a media channel that are identical to the CALL-ID and the media channel in the SIP INVITE message;

detecting by the gatekeeper or SIP server that the CONTINUE CALL messages are no longer being sent;

determining by the gatekeeper or SIP server that the session has ended when a predetermined time period elapses without receiving a CONTINUE CALL message; and sending a BYE message from the gatekeeper or SIP server to the end-point that stopped sending CONTINUE CALL messages when the predetermined time period elapses without receiving a CONTINUE CALL message.

* * * * *